Figure 1:
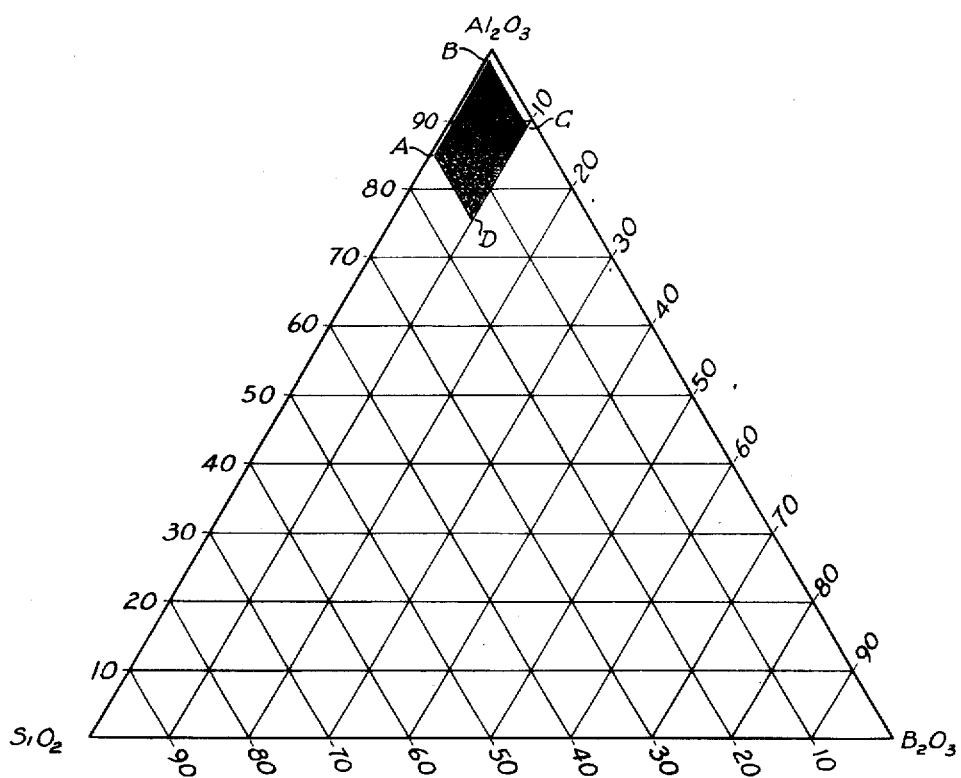

Nov. 30, 1954     J. C. McMULLEN     2,695,849
FUSED CAST REFRACTORY ARTICLES

Filed March 24, 1951     2 Sheets-Sheet 1

INVENTOR.
JOHN C. McMULLEN
BY
ATTORNEY

United States Patent Office 2,695,849
Patented Nov. 30, 1954

2,695,849

FUSED CAST REFRACTORY ARTICLES

John C. McMullen, Niagara Falls, N. Y., assignor to The Carborundum Company, Niagara Falls, N. Y., a corporation of Delaware Application March 24, 1951, Serial No. 217,370

8 Claims. (Cl. 106—65)

This invention relates to fused cast refractory shapes and to compositions for making them. More particularly, it relates to fused cast refractory shapes composed predominantly of alumina which possess unusual electrical properties and unexpectedly high resistance to thermal shock.

Fused cast refractories composed predominantly of alumina have been widely used as linings for glass tanks and other industrial furnaces or equipment. Such alumina bodies in monolithic fused cast form have been found to be quite satisfactory from the standpoint of resistance to corrosion and erosion by molten glass and sufficiently refractory to stand up under the customary temperatures of operation for glass tanks.

However, the manufacture and the use of fused cast refractory products have been fraught with various difficulties and problems which have not been altogether met and overcome by the fused cast refractory compositions heretofore available. In addition to having a resistance to corrosion and erosion by molten glass at the customary high temperatures of operation existing in glass tanks during their operation a satisfactory fused cast refractory composition should also possess the following properties or characteristics. First of all the composition should be one which will furnace without difficulty to form a satisfactorily large molten bath of material which will remain sufficiently fluid during the casting operation to permit the formation of well-formed, relatively smooth surfaced castings of the desired shape. Also, the fused cast composition should be capable of cooling to solidified form without cracking or developing lines of weakness, and upon solidification the fused cast article should preferably be relatively dense and as non-porous as possible. The resulting cast refractory article should also be reasonably resistant to breakdown when subjected to heat shock and should undergo a minimum of change when subjected to high temperatures over prolonged periods of time. Fused cast refractory shapes heretofore available have required, regardless of their overall size or shape, a rather prolonged annealing period following their formation by casting in order to prevent cracking of the article during its solidification.

It is also desirable to provide a fused cast refractory body with a relatively high electrical resistivity over a range of temperature extending from room temperature to temperatures of 1400 or 1500° C. This latter property has become even more important recently in view of the current interest and development of the use of electrical heating for the melting of the glass batch wherein the batch of raw materials used in making glass is melted and maintained in a molten condition in the glass tank by passing an electrical current through the molten material. Such operations obviously require a refractory material for lining the glass tank, which will have a relatively high electrical resistivity relative to the electrical resistivity of the glass which is being melted within the tank.

It is an object of the present invention to provide a fused cast refractory product which is satisfactorily refractory and resistant to the corrosive and erosive conditions encountered in the operation of glass tanks.

It is a further object of the present invention to provide a fused cast refractory product which is not only resistant to corrosion and erosion by molten glass at high temperatures but has a marked resistance to thermal shock.

It is a still further object of the present invention to provide a fused cast refractory product which, in addition to possessing the various desirable refractory qualities required for use in glass tank linings and various other industrial applications, also has a high electrical resistivity at the temperatures at which it is used.

Other objects and advantages accruing from the present invention will become apparent as the description of the invention herein proceeds.

I have found that fused cast refractory articles of the alumina type adapted for use as lining elements for glass tanks and other furnaces and for other high temperature applications can be greatly improved, particularly in resistance to heat shock and high electrical resistivity properties, by the modification thereof with small percentages of silica and boric oxide. I have discovered that fused cast refractory articles composed essentially of alumina, the alumina being from 75 to 98½% by weight of the article, and containing from ½ to 10% of boric oxide and 1 to 15% of silica not only have a satisfactory resistance to corrosion and erosion by molten glass at high temperatures but such compositions also have a remarkable resistance to cracking or other breakdown when exposed to sudden fluctuations of temperature. The silica is usually maintained at 10% or below and the boric oxide is usually maintained between ½ and 3%, although somewhat higher amounts within the range given above can be used. For example, I have found that small fused cast articles, such as a block 9" x 2½" x 4½", and other shapes of comparable size, upon formation by casting the molten material into a mold can be usually allowed to solidify and cool to room temperature without any special annealing procedure without cracking or developing lines of weakness within the article. Such a property is unusual and, as far as is known, has never been encountered in fused cast refractory bodies heretofore known. Moreover, the fused cast compositions of the present invention have an unexpectedly high electrical resistivity as compared to the electrical resistivity of various commonly produced glass compositions and is also many times higher than the electrical resistivity of other fused cast refractory compositions commonly being used as glass tank lining materials. This unusually high electrical resistivity prevails at temperatures up to as high as 1500° C. I have further discovered that in making the fused cast alumina products of the present invention in which the alumina is modified by the presence of small amounts of silica and boric oxide the composition should be relatively free of certain other oxidic materials such as alkali oxides, alkaline earth oxides, iron oxides and titania. The presence of these other oxides has been found to detract considerably from the various desirable properties of the product. For example, fused cast blocks made from raw batches similar to Example I below but containing around ½% iron oxide and around 2% titania were found to crack during annealing. Also, the presence of more than small fractional percentage amounts of alkali oxide in the composition has been found to lower the electrical resistivity markedly.

Figure 2:
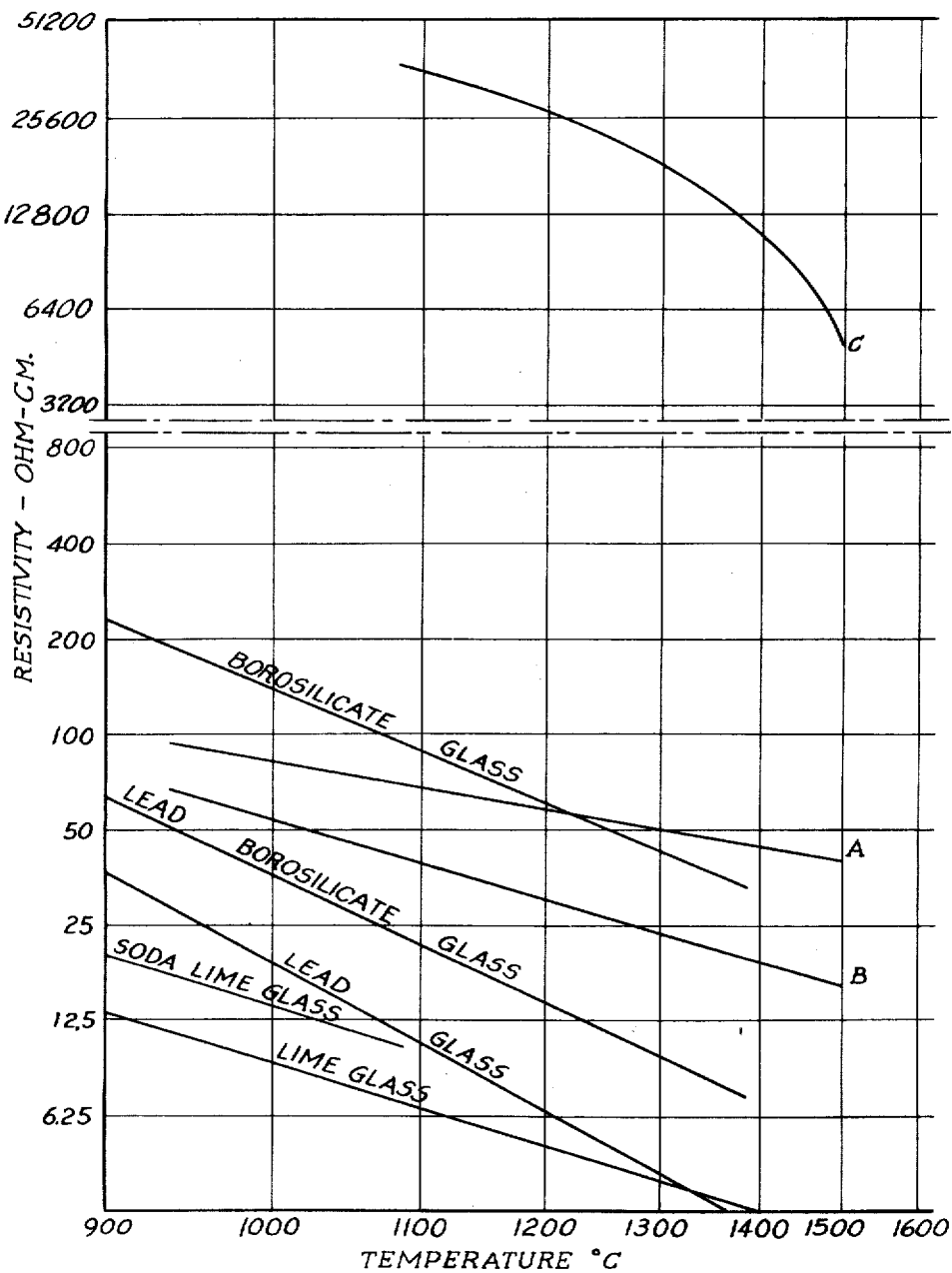

In order that the present invention may be more clearly understood, reference is made to the figures of the drawing in which Figure 1 is a triaxial diagram of the three-phase system of alumina-silica-boric oxide showing the relatively small area ABCD of that system which is embraced by the compositions of the present invention; and Figure 2 is a graph showing the electrical resistivity characteristics of the fused cast bodies of the present invention as compared to the electrical resistivity properties for several conventional glass compositions and also the electrical resistivities of other conventional fused cast refractory compositions.

Examples of compositions of raw batches that have been found satisfactory for the making of fused cast refractory articles of the type herein described are as follows:

*Example 1*

Parts by weight
White alumina ore_____ 91½
Boric oxide_____ 1
Flint (silica)_____ 7½

Example II

| | Parts by weight |
|---|---|
| White alumina ore | 89 |
| Boric oxide | 1 |
| Flint (silica) | 10 |

Example III

| | Parts by weight |
|---|---|
| White alumina ore | 94½ |
| Boric oxide | ½ |
| Flint (silica) | 5 |

Example IV

| | Parts by weight |
|---|---|
| White alumina ore | 94 |
| Boric oxide | 5 |
| Flint (silica) | 1 |

Example V

| | Parts by weight |
|---|---|
| White alumina ore | 98½ |
| Boric oxide | ½ |
| Flint (silica) | 1 |

Example VI

| | Parts by weight |
|---|---|
| White alumina ore | 89 |
| Boric oxide | 10 |
| Flint (silica) | 1 |

A source of alumina which has been found satisfactory for present purposes is that sold by the Aluminum Company of America as A1 grade white alumina ore of which the following is a typical chemical analysis:

| | Percentage |
|---|---|
| $Al_2O_3$ | 98.89 |
| $SiO_2$ | .03 |
| $Na_2O$ | .55 |
| $Fe_2O_3$ | .03 |
| $TiO_2$ | .004 |
| $H_2O$ (combined) | .50 |
| $H_2O$ (free) | 1.25 |

The source material for silica may be either a high purity flint or white sand.

It has been my experience that sources of materials for the alumina, silica or boric oxide which are not of relatively high purity are not satisfactory as a source of the alumina, silica and boric oxide for making the fused cast refractories of the present invention, particularly because of the presence of certain impurities such as iron oxides, titania, alkali and alkaline earth oxides and the like.

It has been also my experience in the making of fused cast shapes from alumina compositions containing minor amounts of silica and boric oxide, such as those set forth above, that the resulting fused cast articles have a tendency to be somewhat porous under normal conditions of fusion unless a small amount of carbon is added to the molten bath. For example, I have found that in carrying out the fusion of the above compositions best results in respect of eliminating undesirable porosity in the finished article are obtained by incorporating around a ¼ of a per cent of coke in the raw batch from which the fusion is made. For example, a mix containing 98% alumina, 1% $B_2O_3$ and 1% $SiO_2$ will produce a porous casting when no carbon is included in the raw batch, whereas upon the addition of 0.25% coke to the raw batch a more dense, non-porous casting results as shown by following table:

| Mix | Percentage Alumina | Percent $B_2O_3$ | Percent $SiO_2$ | Added coke, Parts By Weight | Density, lbs./cu. ft., of finished article | Structure |
|---|---|---|---|---|---|---|
| A | 98 | 1 | 1 | 0 | 184 | Porous. |
| B | 98 | 1 | 1 | 0.25 | 216 | Dense. |

Although it has been pointed out that the addition of coke or other form of finely divided carbon is desirable for the elimination or reduction of porosity in the finished casting the coke is not shown as a constituent of the various compositions shown under the specific examples set forth above since the coke or other form of carbon is not an absolutely essential ingredient. Caution should be taken in adding the coke to keep the amount of coke below that amount which will produce an unstable carbidic structure in the cast article. Detailed instructions in respect to the manner of using small amounts of carbon in the process of making fused cast alumina products for the purpose of avoiding unnecessary porosity is more fully described in U. S. Patent No. 2,196,075 which issued April 2, 1940, to Ian M. Logan and John Charles McMullen.

In the production of refractories of the herein described type the raw batch of materials is fused in a furnace such as a submerged arc furnace (as, for instance, that described in U. S. Patent No. 929,517 to F. J. Tone) similar to that used in the production of synthetic alumina abrasives. In carrying out the fusion, the furnace generally consists of a water-cooled iron shell, having no other lining than that built up by the material being fused as it is fed into the furnace. Fusion is effected initially by the heat from a carbon train between two or more carbon or graphite electrodes inserted in the iron shell, but after a bath of molten material is formed the resistance of the molten material to the passage of electric current therethrough is used to supply heat. The material is gradually fed in, and the electrodes raised, as the fused mass is built up. The procedure followed is substantially similar to that employed in making ordinary aluminous abrasive. When the material has arrived at the proper temperature and the correct degree of fluidity and an adequate bath is obtained, it is poured into molds of the desired shape and size.

The molded pieces are left in the mold for heat treatment, or, particularly in the case of iron or other metallic molds, are taken from the molds shortly after the outer walls of the casting have solidified. Thereafter, for best results they are preferably carefully cooled by any of the methods well-known in the art, and after they are cooled may have remainder of the header or other minor roughness removed by chipping or grinding. As pointed out earlier herein, the smaller size castings can be made and removed from the mold and cooled without any special annealing procedure, if desired, although it is usually considered preferred practice to further guarantee soundness of the finished article by suitable annealing procedure whenever the facilities for such annealing are available.

The fused cast refractory products made in accordance with the teachings of the present invention are outstanding in their resistance to cracking or other breakdown when subjected to the thermal shock caused by sudden fluctuations of temperature. This resistance to thermal shock was determined by a spalling test which consisted of placing a 9" fused cast brick 9" x 4½" x 2½" in size of the composition to be tested in a furnace maintained at 700° C. After one hour the brick was removed and allowed to cool in air. The placing of the brick in the furnace at 700° C. for one hour followed by air cooling to approximately room temperature is designated as one cycle. This cycle of operations was repeated until the brick being tested broke or until 20 cycles of the test had been completed. Such a spalling test has been found to correlate with actual service results on fused cast refractory products. Fused cast refractory bricks having the composition of Example II above underwent 40 cycles of such a spalling test without cracking or other perceptible change, and fused cast refractory bricks having the composition of Examples I and IV above underwent 29 and 28 cycles, respectively, of the above test before cracking. Fused cast refractory bricks having compositions shown in Examples III and VI underwent 23 and 15 cycles respectively before cracking. A fused cast refractory block made in accordance with Example V above which contains as low as ½% $B_2O_3$ and 1% $SiO_2$ underwent a full 9 cycles before showing any signs of cracking. By comparison, a fused cast refractory composed of alumina and chromite, made in accordance with U. S. Patent No. 2,063,154, failed after only 3 cycles of the above test and a similar fused cast refractory brick composed of alumina together with small amounts of an alkaline oxide, an alkaline earth oxide and silica, made in accordance with the teachings of U. S. Patent No. 2,474,544, failed after only 5 cycles of the same spalling test.

Fused cast refractory articles made in accordance with the present invention were tested and found to be highly satisfactory in their resistance to corrosion and erosion by molten glass temperatures as high as 1500° C.

The electrical resistivity of the fused cast compositions made as herein described are best shown by Figure 2 which presents in graph form the electrical resistivity in ohm-centimeters between the temperatures of 900 and 1500° C. of a number of conventional glasses and also the electrical resistivity of several fused cast refractory compositions, including a composition typical of those herein disclosed. It is to be noted that fused cast refractory bodies made in accordance with U. S. Patents Nos. 2,043,029 and 2,747,544 have electrical resistivities within the above temperature range in the neighborhood of 15–100 ohm-centimeters as shown by curves A and B, whereas, by comparison, a fused cast refractory body made in accordance with the present invention and having the composition of Example I above, over the same range of temperature has an electrical resistivity of from 5,000 to 30,000 ohm-centimeters, as shown by curve C of the graph. Such outstanding superiority in electrical resistivity is especially valuable when such refractories are designed for use in glass tanks or other furnaces where it is desired to heat the material by the passage of an electrical current through the batch of glass or other substance heated without loss of efficiency by transmission of a large portion of the electrical current through the refractory lining.

The electrical resistivities shown in Figure 2 were determined by a method of measuring electrical resistance described in an article on pages 12–15 of the January 1950 issue of the Bulletin of the American Ceramic Society.

Having described the invention in detail, it is desired to claim:

1. A fused cast refractory article composed of 75 to 98½% alumina, 1 to 15% silica and ½ to 10% boric oxide.

2. A fused cast alumina refractory article containing 1 to 15% silica and ½ to 10% boric oxide, the remainder being alumina.

3. A fused cast refractory article composed of 91½% alumina, 7½% silica and 1% boric oxide.

4. A fused cast alumina refractory article in which, by chemical analysis, the alumina content is over 75%, with the remainder being small amounts of silica and boric oxide.

5. A fused cast alumina refractory article in which, by chemical analysis, the alumina content is over 75%, with the remainder being small amounts of silica and boric oxide, said article having an electrical resistivity between 1000° C. and 1400° C. several hundred times the electrical resistivity of soda-lime-glass between the same temperatures.

6. A fused cast alumina refractory article in which, by chemical analysis, the alumina content is over 75%, with the remainder being small amounts of silica and boric oxide, said article having an electrical resistivity between 1000° C. and 1400° C. in the order of magnitude of several thousand ohm-centimeters.

7. A fused cast refractory containing, by chemical analysis, 1 to 10% silica and ½ to 3% boric oxide, the remainder being alumina.

8. A fused cast refractory article consisting essentially of at least 75% alumina together with 1 to 15% silica and ½ to 10% boric oxide, said article being free from detrimental amounts of alkali oxides, alkaline oxides, iron oxides and titanium oxide.

References Cited in the file of this patent

UNITED STATES PATENTS

| Number | Name | Date |
|---|---|---|
| 1,442,773 | Richmond et al. | Jan. 16, 1923 |
| 2,331,232 | Ross | Oct. 5, 1943 |
| 2,436,708 | Bonnet et al. | Feb. 24, 1948 |
| 2,494,277 | Austin et al. | Jan. 10, 1950 |
| 2,502,198 | Benner et al. | Mar. 28, 1950 |

UNITED STATES PATENT OFFICE
CERTIFICATE OF CORRECTION

Patent No. 2,695,849                                          November 30, 1954

John C. McMullen

It is hereby certified that error appears in the printed specification of the above numbered patent requiring correction and that the said Letters Patent should read as corrected below.

Column 3, line 69, before "following" insert -- the --; column 5, line 13, for the patent number "2,747,544" read -- 2,474,544 --.

Signed and sealed this 22nd day of July 1958.

(SEAL)

Attest:

KARL H. AXLINE
Attesting Officer

ROBERT C. WATSON
Commissioner of Patents